Jan. 10, 1967  J. L. WEININGER  3,297,486
NON-ISOTHERMAL VOLTAIC CELL HAVING IODINE ELECTRODES
Filed May 15, 1963
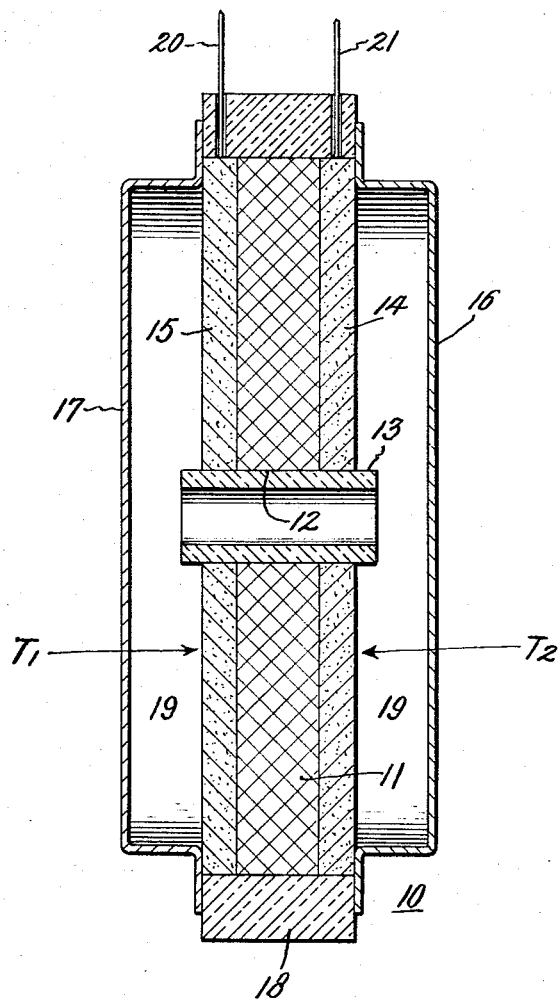
Inventor:
Joseph L. Weininger,
by Paul R. Webb, II
His Attorney.

United States Patent Office 3,297,486
Patented Jan. 10, 1967

3,297,486
NON-ISOTHERMAL VOLTAIC CELL HAVING IODINE ELECTRODES
Joseph L. Weininger, Schenectady, N.Y., assignor to General Electric Company, a corporation of New York
Filed May 15, 1963, Ser. No. 280,582
3 Claims. (Cl. 136—86)

This invention relates to non-isothermal voltaic cells and more particularly to non-isothermal voltaic cells with gaseous electrodes which cells are operable at elevated temperatures.

A non-isothermal voltaic cell or thermocell is a device for converting heat energy into electrical energy by electrochemical reaction. In such a cell, two identical electrodes are provided which are separated by an electrolyte. The two electrodes are maintained at different temperatures and the temperature differential between the two electrodes generates electrical potential between the two electrodes. In the usual operation of such cells, the overall cell reaction results in the transport of electrode material from one electrode to the other. This transport of electrode material from one electrode to the other limits the useful life of such cells, since these cells cease to operate as soon as all the material from one of the electrodes is depleted.

In U.S. Letters Patent 2,890,259 issued on June 9, 1959, and assigned to the same assignee as the present application, there is disclosed a non-isothermal voltaic cell wherein there is no depletion of electrode material. In this patent there is described and claimed a non-isothermal voltaic cell including iodine electrodes in the gaseous state, a silver iodide electrolyte, inert metal electrodes in contact with the iodine electrodes and with the electrolyte, and passage means for permitting iodine to travel from the anode side of the cell to the cathode side of the cell. The present application is directed to an improved non-isothermal voltaic cell wherein inert carban conductors in the iodine electrodes are in contact with the electrolyte and with the iodine in gaseous state resulting in a much higher thermoelectric coefficient.

It is an object of my invention to provide an improved non-isothermal voltaic cell.

It is another object of my invention to provide an improved non-isothermal voltaic cell in which there is no depletion of the material of one electrode.

It is another object of my invention to provide a high temperature non-isothermal voltaic cell useful for the conversion of thermal energy into electrical energy.

It is a further object of my invention to provide a high temperature non-isothermal voltaic cell which employs inert carbon conductors in the iodine electrodes.

In carrying out my invention in one form, a non-isothermal voltaic cell comprises iodine electrodes, each of said electrodes comprising an inert carbon conductor and iodine in the gaseous state, a silver iodide electrolyte, the inert carbon conductor in contact with said electrolyte and with said iodine in the gaseous state, and passage means for permitting iodine to travel from the anode side of the cell to the cathode side of the cell.

These and various other objects, features and advantages of the invention will be better understood from the following description taken in connection with the accompanying drawing in which:

The single figure of the drawing is a sectional view of a non-isothermal voltaic cell embodying my invention.

In the figure there is shown generally at 10 a non-isothermal voltaic cell which comprises a solid silver iodide electrolyte 11 which is in the form of a flat annular ring having a central aperture 12 in the axis thereof. In this aperture is located a hollow cylindrical insulating member 13 which may be formed at any suitable imperforate ceramic material, such as a glazed alumina. A pair of inert carbon conductors 14 and 15, which are the electronic conductors of the iodine electrodes, are placed on either side of and in contact with the silver iodide electrolyte 11. These electrodes are shown as generally annular in shape with their central aperture designed to fit around the outer periphery of member 13. This entire assembly is sealed in a suitable housing comprising members 16 and 17 by soldering or otherwise joining these members to an electrically insulating gasket 18.

Gasket 18 may be formed of an imperforate ceramic material or any other imperforate material which is stable to at least a temperature of 550° C. The housing is formed of any material which is not corroded by iodine. Suitable materials for such a housing include stainless steel, Nichrome, nickel and various ceramic materials. However, for ease of heat transfer, it is preferred to have members 16 and 17 formed of a metal. The function of gasket 18 is to make the entire assembly gas tight, to prevent electrical contact between housing members 16 and 17, and to provide a means of anchoring conductors 14 and 15 so as to maintain conductors 14 and 15 in contact with electrolyte 11.

As is shown in the drawing, gasket 18 is the same thickness as electrolyte 11 and conductors 14 and 15 whereby its inner periphery is in contact with the outer periphery of silver iodide electrolyte 11 and conductors 14 and 15 so as to anchor the electrolyte and the conductors. Free space 19 within cell 10 is filled with iodine, which iodine in the gaseous state with inert carbon conductors 14 and 15 provides the iodine electrodes of the cell. Leads 20 and 21 are attached to conductors 14 and 15 by inserting each lead through a separate aperture in gasket 18. These leads connect the electrodes to any load (not shown).

Conductors 14 and 15 do not take part in the cell reaction, but are provided to serve as sites for the electrode reaction between the iodine in the gaseous state and electrolyte 11. Another function of inert carbon conductors 14 and 15 is to provide heat transfer to and from the cell so that the interfaces between the electrolyte 11 and the iodine in gaseous state may be at the desired tempertaure. The pressure of the iodine in cell 10 may vary within wide limits. Preferred iodine pressures are on the order of from about fractions of a millimeter up to about 100 millimeters.

In the construction of the cells of the present invention, a hole or aperture is provided in a pair of inert carbon conductors 14 and 15. A hollow cylindrical ceramic member 13 is positioned through carbon conductor 14. Molten silver iodide at a temperature above its melting point of 552° C. is poured into a metal ring supported around the outer periphery of carbon conductor 14 near one of its ends to form a flat annular plate affixed to the carbon conductor and surrounding hollow cylindrical ceramic member 13. The other carbon conductor is positioned on the opposite end of ceramic member 13 and pressed against the molten silver iodide. After the sub-assembly has cooled, an electrically insulating gasket 18 is positioned around the outer periphery of the silver iodide electrode 11 and conductors 14 and 15. A pair of apertures are provided in gasket 18 through which leads are subsequently inserted. The iodine of the iodine electrodes is placed in cell 10 by any suitable means. The most satisfactory method of incorporating the iodine in the cell structure is to place iodine crystals in one or both of members 16 and 17 prior to attachment of these members.

I discovered that the employment of carbon conductors in contact with a silver iodide electroyle and in contact with iodine in gaseous state in a non-isothermal voltaic cell provided a cell with a much higher thermoelectric coefficient. For example, I found that the thermoelectric coefficient of such a cell was between 1.2 and 1.4 millivolts per degree centigrade. I found further that carbon was a very suitable inert conductor for the iodine electrodes to be employed in such a cell. Additionally, the employment of carbon conductors produced a less expensive cell wherein carbon was employed rather than a metal such as platinum. The carbon is also suitable from the standpoint that it is not corroded by iodine. Thus, my improved non-isothermal voltaic cell produces a higher thermoelectric coefficient, and has inexpensive conductors which are both inert and not subject to attack by iodine.

In the operation of the cell, a temperature differential must be maintained between the iodine electrodes so as to generate an electromotive force between the two electrodes. It has been found that cell 10 is more efficient when the cooler of the electrode is at a temperature of at least 145° C. The temperature of the warmer electrode may then vary up to about 550° C. Thus, the maximum efficient temperature differential between the electrodes is about 405° C. In the operation of the cell of the present invention in the temperature range described, it is found that the thermoelectric coefficient between the two electrodes is between 1.2 and 1.4 millivolts per degree centigrade. Thus, with one of the electrodes at a temperature of 200° C. and the other of the electrodes at 300° C., the electromotive force of the cell is between 120 to 140 millivolts.

The operating range of the cell in the present invention is based upon the fact that silver iodide exists in its alpha form at a temperature from about 145° C. to about 550° C. In this alpha form, the resistivity of silver iodide is extremely low so that high currents are possible from the cells of the present invention.

The chemical reaction involved in the cells of the present invention results in the transport of iodine from the hot electrode to the cold electrode of cell 10. Specifically at the high temperature electrode, or cathode, iodine plus electrons form iodide ions. In the single figure of the drawing, a high temperature electrode or cathode is indicated as inert carbon conductor 14 and iodine in the gaseous state which is maintained at a temperature $T_2$. At the cold electrode, or anode, iodide ions are converted to iodine with the release of electrons. In the single figure of the drawing, the cold electrode or anode is indicated as inert carbon conductor 15 and iodine in the gaseous state which is maintained at a temperature of $T_1$. Temperature $T_1$ is lower than $T_2$. Since iodine is used up at the cathode and given off at the anode, the pressure of the iodine at the cathode side of the cell tends to fall while the pressure at the anode side of the cell begins to rise. The cylindrical member 13 of cell 10 is provided so that iodine can travel from the high pressure region at the anode to the low pressure region at the cathode and thus maintain a uniform iodine pressure on both sides of electrolyte 11 and in effect replenish the iodine from the cathode as it is used. In former cells prior to above-mentioned U.S. Letters Patent 2,890,259, no method was provided to replenish the electrode which was consumed during cell operation.

In the single figure of the drawing, member 13 in the form of a hollow tube returns iodine from the anode to the cathode. This member may also consist of a porous ceramic cylinder so that the iodine may diffuse through the porous cylinder while at the same time the cylinder provides a baffle against rapid mass and heat transfer. With this porous construction, it is easier to maintain electrodes 14 and 15 at the desired temperature differential. In further modification of the cell of the present invention, member 13 may be eliminated entirely, so long as aperture 12 is left in electrolyte 11 to allow return of iodine from the anode to the cathode. The passage of iodine from the anode to the cathode side may also be accomplished in other manners. For example, a passage is provided at one point between the housing, and the electrolyte and conductors. A passage may also be provided between the housing, and the electroylte and conductors. In the latter example, the electroylte and conductors are supported in any suitable manner within the housing.

At a given temperature difference between electrodes, the current obtainable from a cell of the present invention varies with the internal resistance of the cell, which in turn varies inversely with the cross-sectional area of contact between electroylte 11 and the iodine electrodes, and directly with the thickness of electroylte 11.

For a cell having the configuration of cell 10 with the surface area of the electrolyte 11 on each side of the cell being 10 square centimeters, with an electrolyte thickness of 0.1 centimeter, with iodine electrodes having iodine in the gaseous state at one atmosphere and porous graphite conductors, and the electrodes at temperatures of 400° C. and 200° C., respectively, an open circuit voltage of 280 millivolts is obtained with a short circuit current up to 100 milliamperes.

Although cells of the present invention have been described primarily in terms of circular or annular members, it should be understood that the shape of the cell is unimportant for purposes of the present invention. It is required that the cell contain a silver iodide electroylte, iodine electrodes adapted to operate at different temperatures, the electrodes comprising inert carbon conductors and iodine in the gaseous state, and means for returning iodine from the side of the cell at which it is formed to the side of the cell at which it is consumed.

While other modifications of this invention and variations thereof which may be employed within the scope of the invention have not been described, the invention is intended to include such that may be embraced within the following claims.

What I claim as new and desire to secure by Letters Patent of the United States is:

1. A non-isothermal voltaic cell comprising iodine electrodes, each of said electrodes comprising an inert carbon conductor and iodine in the gaseous state, a silver iodide electrolyte, the inert carbon conductor in contact with said electrolyte and with said iodine in the gaseous state, and passage means for permitting iodine to travel from the anode side of the cell to the cathode side of the cell.

2. A non-isothermal voltaic cell comprising a silver iodide electrolyte, a pair of iodine electrodes, each of said electrodes comprising an inert carbon conductor and iodine in the gaseous state, the inert carbon conductor of said first iodine electrode in contact with one side of said electrolyte, the inert carbon conductor of said second iodine electrode in contact with the other side of said electrolyte, a housing defining a gas tight chamber surrounding said electrolyte and said iodine electrodes, and passage means for permitting iodine to travel from the anode side of the cell to the cathode side of the cell.

3. A non-isothermal voltaic cell comprising a silver iodide electrolyte having an aperture therethrough, a pair of iodine electrodes, each of said electrodes comprising an inert carbon conductor and iodine in the gaseous state, the inert carbon conductor of said first electrode in contact with one side of said electrolyte, the inert carbon conductor of said second electrode in contact with the other side of said electroylte, each of said conductors having an aperture therethrough communicating with the aperture in said electrolyte, an electrically insulating gasket surrounding the outer periphery of said electrolyte and said conductors, a first housing member joined to one surface of said gasket, a second housing member joined to the opposite surface of said gasket, and said housing member defining a gas tight chamber confining the iodine in gaseous state.

No references cidted.

WINSTON A. DOUGLAS, *Primary Examiner.*

A. B. CURTIS, *Assistant Examiner.*